Jan. 7, 1947.  L. B. HARRIS  2,413,918
FLOATING FISH FACTORY
Filed July 9, 1945   4 Sheets-Sheet 1

INVENTOR
Leonard B. Harris
BY Joseph Blacker
ATTORNEY

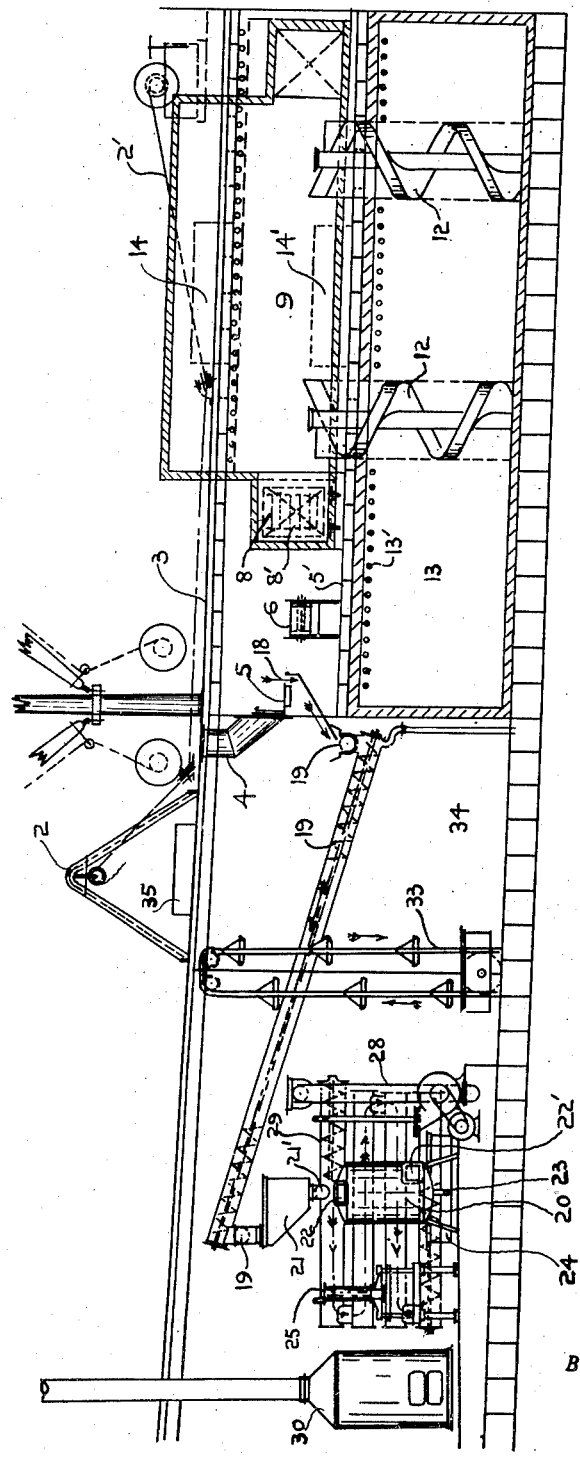

Jan. 7, 1947. L. B. HARRIS 2,413,918
FLOATING FISH FACTORY
Filed July 9, 1945 4 Sheets-Sheet 4
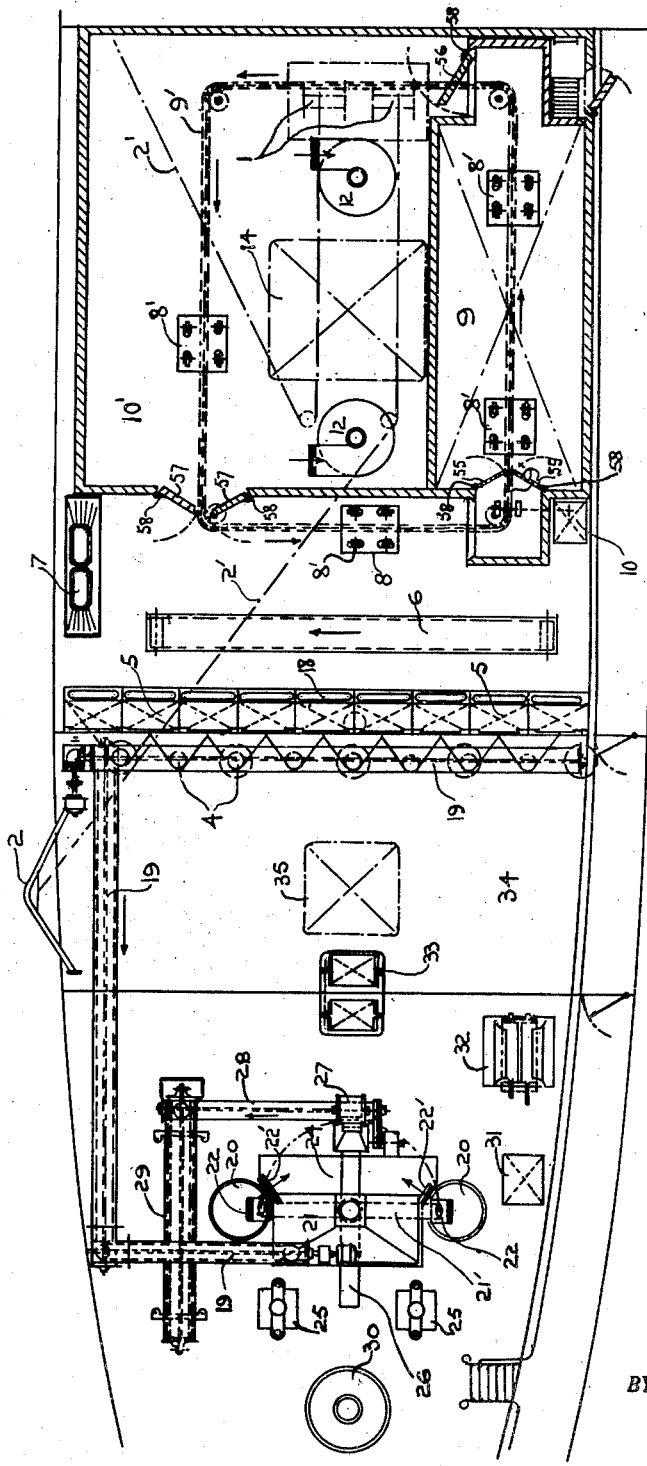
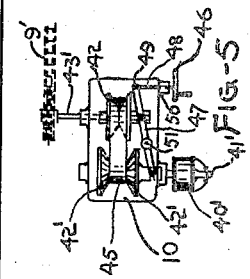
INVENTOR.
Leonard B. Harris
BY Joseph Blacker
ATTORNEY Patented Jan. 7, 1947

2,413,918

UNITED STATES PATENT OFFICE 2,413,918

FLOATING FISH FACTORY

Leonard B. Harris, Southold, N. Y.

Application July 9, 1945, Serial No. 603,927

9 Claims. (Cl. 114—0.5)

My invention relates to a vessel equipped with mechanism which adapts the vessel to be used as a "floating fish factory."

The following is a brief outline of the main objects of this invention and the operation of the vessel.

The vessel at sea is equipped with gallows, winches, and trawl gear and will drag or trawl in the usual manner, and when the net is hauled in, the fish are dumped on the deck and sorted. The edible fish are pitched down individual hatches leading to cutting tables on the between decks, where they are filleted and cleaned before passing through a "quick freeze" tunnel.

The fillets come out of the tunnel at about five degrees below zero Fahrenheit and are packed in boxes or containers which pass down by gravity into a cold storage hold in the belly of the ship, to be held there until port is reached, where they are discharged, ready for the consumer.

The fish are processed, frozen and packed within two hours of the time they are caught. This quick processing gives the fish product a high degree of quality.

The livers are steamed and cooked to extract the liver oil; the remaining parts of the fish, together with undesirable fish, viz., fish that are not edible or marketable as such, instead of being thrown overboard are passed on from cutting tables to conveyors, which in turn deliver them, with all other fish refuse, to digestors or cookers, to extract the oils and fats.

The cooked products pass to presses and crushers, and eventually to dryers, and come out as fish meal or fertilizer, and bagged and stored.

The oil and liquor are pumped into storage tanks, and therefore every portion of the fish is ready for the market when the ship reaches port.

An object of this invention is to cause the fish products landed from this type of factory ship at the wharf to require a minimum of handling and wharf space and which can be shipped immediately by refrigerator car direct to the consumer.

In my disclosure herewith, the fish processing machinery has a balanced relationship relatively to the propulsion machinery of the ship so that the ship will ride on an even keel and will not be down at the bow or stern regardless of the weight of the load in the cargo space.

The "floating fish factory" ship is adapted to follow the fishing fields and seasons and deliver at the nearest port, whereas the land fish factories require long hauls from the fishing banks to their own docks, where the fish are brought in a haphazard manner of a "feast or famine," according to the weather off shore.

The characteristics and advantages of the invention are explained in connection with the following detailed description of the accompanying drawings.

After considering these descriptions, skilled persons will understand that variations may be made without departing from the principle involved and I contemplate the employment of any structures that are properly within the scope of the appended claims.

Figure 3 is an enlarged longitudinal section through the ship, showing the factory arrangement.

Figure 4 is a plan view of the fish factory arrangement shown in Figure 3.

Figure 5 is a view of a variable speed mechanism for controlling the speed of trucks loaded with fish products to be frozen while passing through a "quick freezing tunnel."

Figure 1:
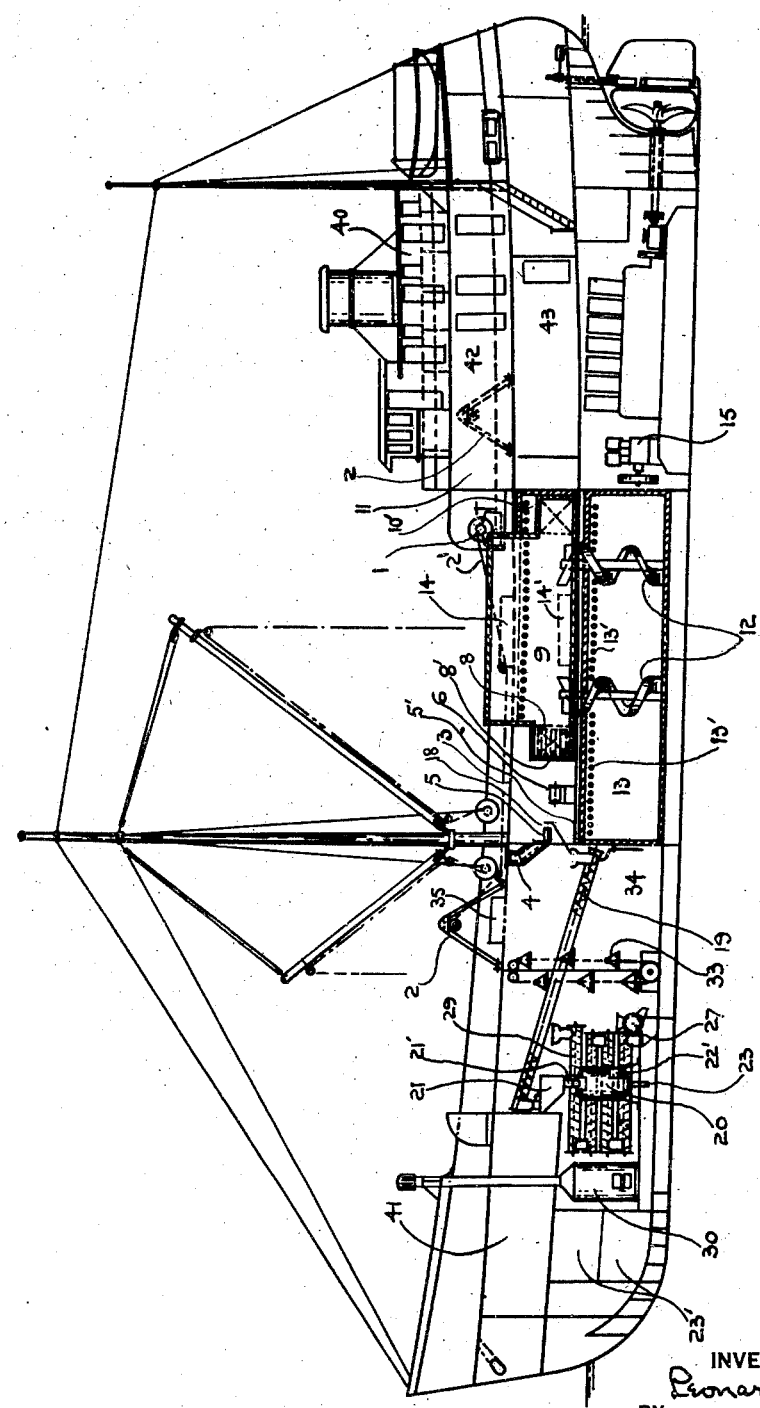
Figure 1 is a longitudinal cross-sectional view of the vessel, the section being taken as on line 1—1 in Figure 2.

The vessel is of the well-known trawler or dragger type, equipped with winches 1, gallows 2, dragging cables 2', otter boards and nets, etc., and the ship at sea trawls in well known manner.

When the nets are hauled in, the fish are dumped on the main deck 3 and sorted. The edible fish are pitched down individual chutes 4, which lead through the main deck 3 to cutting tables 5, on the between deck 5'. On the cutting tables 5, the fish are filleted and cleaned and then passed onto a conveyor or traveling table 6, to be conveyed to washing bins 7. After washing the fillets or cleaned fish are placed on trays 8, on trucks 8'.

Figure 2:
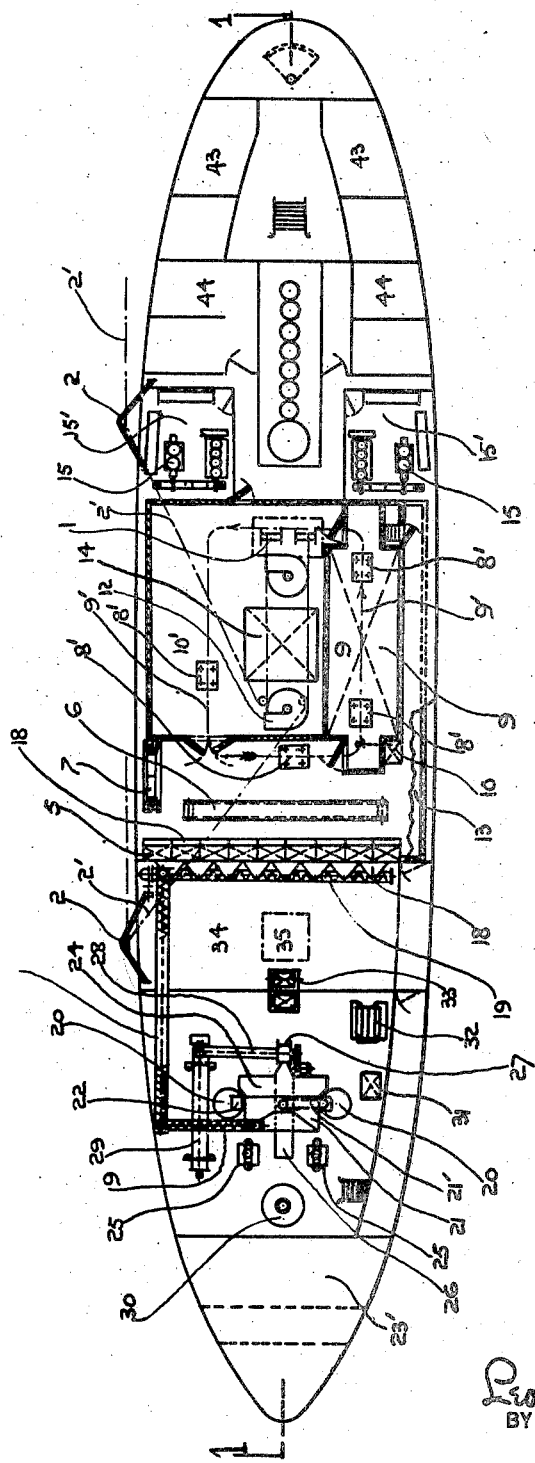
Figure 2 is a plan view, the top deck being removed to show the interior.

The trucks 8', of which there are a large number, form a train which is pulled through a "quick freeze tunnel" 9, by means of a continuous conveyor chain 9'. The course of travel of this chain is shown by arrow lines in Figures 2 and 4. The speed of the conveyor chain is controlled by a variable speed mechanism 10 shown in Figure 5.

The "quick freeze tunnel" 9, is maintained at a temperature of approximately five degrees below zero Fahrenheit. A packing room 10' is positioned adjacent to the tunnel, and in which room the trucks 8', are unloaded as they pass through, after coming out of the "quick freeze tunnel." The temperature of the packing room 10' is also maintained below freezing temperature.

In the packing room 10', which is completely insulated and equipped with refrigeration coils, the fish are packed in boxes, cans, or containers which have been previously stored in room 10', to be brought to freezing temperature. After being packed, the packages are ready for the market and are passed by gravity down spiral chutes or gravity conveyors 12, to a cold storage hold 13, in the belly of the ship.

The cold storage hold is completely insulated and equipped with refrigeration coils 13' and is maintained at a temperature of approximately five degrees below zero Fahrenheit. Here the fish are stored in packages until the vessel arrives in port, where they are discharged through unloading hatches 14 and 14', in the main deck and between decks respectively, ready for the consumer.

The packing room 10' and the "quick freeze tunnel" 9, and the cold storage hold 13, have their temperature controlled by a freezing plant 15. The freezing plant 15 is in duplicate, as shown in the vessel at 15', together with their condensers, liquid receivers, compressors and power plants.

At the edge of the cutting tables 5, are chutes or troughs 18, leading to conveyors 19 of spiral or other suitable type, which deliver all fish refuse to a hopper or bin 21, which in turn feeds the refuse to digestors or cookers 20, through a swinging chute 21', leading to digestor charging doors 22, at the top of the digestors.

Liquids from the cookers 20 passes out through a bottom drain pipe 23, to be pumped into storage tanks 23'.

The cooked products from the digestors are hauled out through discharge doors 22', at the bottom of the digestors into a receiving pan 24. The cooked products are then transferred to hydraulic or steam presses 25, shown in duplicate, to extract the last of the fats and oils. From the presses the cooked products are conveyed along a runway 26, to a grinder 27. After being crushed in the grinder the ground products or fish meal travel by a conveyor 28, to a steam jacketed dryer 29. The steam for this dryer and also for the cookers is supplied from a boiler 30, which may also be augmented by heat from the main propelling engine heat exchangers.

A filter 31, to filter the liquor from the digestors, and a glue-making machine is shown at 32. The fish meal, when bagged, is hoisted by a bag conveyor 33, best shown in Figures 3 and 4, to be stacked in storage in hold 34. Discharge hatch 35, serves for unloading bags of fish meal.

It is to be noted that by "quick-freezing tunnel" I mean to imply a type of tunnel through which fish products, etc., are quickly carried by a conveyor and that a below freezing temperature is maintained in the tunnel. Also, that it is due to this quick motion through the quick-freezing tunnel that the products are frozen in a few minutes in individual units and not in clusters, whereas with stationary freezing chambers it takes hours to bring the products to freezing temperature and it is hard to prevent clustering.

The means for varying the speed of the conveyor 9' through the "quick freeze tunnel" 9 and through the packing room 10' comprises a motor 40' having its shaft 41' splined (not shown). Cone pulleys 42' are slidably mounted on the splined portion of the motor shaft 41'.

The motor shaft 41' constitutes the power or drive shaft. A driven shaft 43' is suitably mounted parallel to the drive shaft 41'. The shaft 43' has splines (not shown). Cone pulleys 42' of the same size and structure as the cone pulleys 42' on the shaft 41' are slidably mounted on the driven shaft 43'. A V-type belt 45 connects the pulleys 42'. A handwheel 46 is threadably mounted in relation to a threaded nut 50. The far end of the handwheel shaft 48 is pivotally connected at a point 49 with one end of lever 47. The lever 47 is fulcrumed at 51.

As is well known in the art, the lever 47 causes two pulleys 42' to come closer together and the other two pulleys 42' to move further apart and thereby vary the speed of the conveyor belt 9'.

It is to be noted that doors 55, 56, and 57 are provided to keep the tunnel 9 and the packing room 10' in a sealed condition. For this purpose all the door hinges are equipped with torsion springs 58. The trucks open the doors by contact. When the trucks pass through the doorways the doors automatically close.

From the description presented, it will be fully appreciated that the heavy propulsion machinery for the ship, together with the refrigerating mechanism, are located at the stern of the ship and are balanced by the relatively heavy fish processing machinery within the forward end of compartment 34 at the bow of the ship. The variable cargo space represented by the cold storage room 13 is amidships.

Since the arrangement of the propulsion machinery and fish processing machinery is such that the ship is neither down at the bow nor down at the stern when the storage room 13 is empty, the filling of the storage room 13 will not destroy this relationship. The ship will therefore ride with its bow and stern in proper relationship under all conditions of loading.

Referring to Figure 1, the numeral 40 identifies the officers' quarters, 41 identifies the crew's quarters, 42 identifies the engineers' quarters, and 43 identifies package rooms.

This continuous balance is rendered further effective by the arrangement of the accommodations for the fishing and ship personnel of the crew, relatively placed at the bow and stern.

In accordance with the patent statutes I have described and illustrated the preferred embodiment of my invention, but it will be understood that various changes and modifications can be made therein without departing from the spirit of the invention as defined by the appended claims.

I claim:

1. In a fishing ship of the class described, fish processing machinery fixedly positioned in the bow end of the ship, propulsion machinery fixedly positioned in the stern of the ship, refrigeration machinery in the stern of said ship, said propulsion and refrigeration machinery balancing said fish processing machinery so that said ship rides in a balanced position neither down at the bow or stern, a variable cargo and refrigeration space amidships of said ship for the fish and by products processed in said ship and by said fish processing machinery, whereby the ship will not be down at the bow or stern regardless of the weight of the variable load in said space, a 'tween deck over the variable cargo hold where fish are initially processed and forwarded to said refrigeration space, and an automatic conveyor means for conveying fish or parts thereof from said 'tween deck to said fish processing machinery.

2. In a fishing ship of the class described, fish processing machinery fixedly positioned in the bow end of the ship, propulsion machinery fixedly positioned in the stern of the ship and centrally abeam thereof, refrigeration machinery at the port and starboard sides of said propulsion machinery in balancing relation, said propulsion and refrigeration machinery balancing said fish processing machinery so that said ship rides in a balanced position neither down at the bow or stern, accommodations for the ship's crew located at the stern, accommodations for a fishing crew located at the bow, and a variable cargo and refrigeration space amidships of said ship for the fish and by products processed in said ship and by said fish processing machinery, whereby the ship will not be down at the bow or stern, regardless of the weight of the variable load in said space.

3. In a fishing ship of the class described, fishing equipment mounted on the main deck of said ship, fish processing machinery fixedly positioned in the bow end of the ship, propulsion machinery fixedly positioned in the stern of the ship, refrigeration machinery in the stern of said ship, said propulsion and refrigeration machinery balancing said fish processing machinery so that said ship rides in a balanced position neither down at the bow or stern, a variable cargo and refrigeration space amidships of said ship for the fish and by-products processed in said ship and by said fish processing machinery, whereby the ship will not be down at the bow or stern, regardless of the weight of the variable load in said space, a 'tween deck over the variable cargo hold where fish are initially processed and forwarded to said refrigeration space, and an automatic conveyor means for conveying fish or parts thereof from said 'tween deck to said fish processing machinery.

4. In a fishing ship of the class described, fish processing machinery fixedly positioned in the bow end of the ship and balanced against listing, propulsion machinery for said ship fixedly positioned in the stern and balanced also against listing, said propulsion machinery balancing said fish processing machinery so that said ship rides in a balanced position neither down at the bow or stern, a variable cargo space for the fish and the fish products processed by said fish processing machinery positioned amidships of said ship whereby the ship will not be down at the bow or stern regardless of the weight of the variable load deposited in said variable cargo space, a bulkhead separating the variable cargo space and the fish processing machinery, and a vertical and lateral conveyor movable vertically relatively to said bulkhead in said variable cargo space and laterally of said bulkhead in and out of said variable cargo space.

5. A floating fish factory comprising a hull, a fish receiving deck upon said hull, a fish handling deck below said receiving deck, and a cold storage hold below said fish handling deck, a plurality of fish handling tables upon said fish handling deck, a plurality of chutes for delivering edible fish from said receiving deck to said handling tables, a quick-freeze room and a packing room on said fish handling deck adjacent to said fish handling tables, racks for receiving edible fish elements, movable into and out of said quick-freeze and packing rooms, and conveyors for conveying packaged elements into said cold storage hold.

6. A device according to claim 5 having means for processing inedible elements, situated in a remote portion of the ship, and conveyor means for moving said elements from the handling tables to the processing devices.

7. A floating fish factory comprising a hull, a fish receiving deck and a fish handling deck upon said hull, and a cold-storage hold below said handling deck, a plurality of fish handling tables upon said handling deck, and means for delivering edible fish from said receiving deck to said handling tables, a quick-freeze room, and a packing room adjacent to said handling tables, and racks for receiving edible fish elements movable into and out of said quick-freeze and packing rooms, and conveyors for conveying packaged elements into said cold-storage hold.

8. A floating fish factory comprising a hull, a fish receiving deck and a fish handling deck upon said hull, and a cold-storage hold below said handling deck, a plurality of fish handling tables upon said handling deck, and means for delivering edible fish from said receiving deck to said handling tables, a quick freeze room, and a packing room adjacent to said handling tables, and racks for receiving edible fish elements movable into and out of said quick-freeze and packing rooms, and conveyors for conveying packaged elements into said cold-storage hold, processing machinery located in the bow of the ship, and conveyor means for moving inedible portions of said fish from the handling tables to the processing machinery.

9. A floating fish factory comprising a hull, having a deck and a cold-storage hold below said deck, fish-handling tables upon said deck on which the edible portions may be separated from the remaining portions of the fish, quick-freezing apparatus upon said deck adjacent to said tables, and fish processing apparatus within said hull and remote from said tables, and a conveyor for conveying edible portions of the fish through the quick-freezing apparatus for delivery to said cold storage hold, and a separate conveyor for conveying inedible portions of the fish to said processing apparatus.

LEONARD B. HARRIS.